United States Patent [19]

Miller

[11] Patent Number: 5,354,997
[45] Date of Patent: * Oct. 11, 1994

[54] METHOD FOR INCREASED SENSITIVITY OF RADIATION DETECTION AND MEASUREMENT

[75] Inventor: Steven D. Miller, Richland, Wash.

[73] Assignee: Battelle Memorial Institute, Richland, Wash.

[*] Notice: The portion of the term of this patent subsequent to Dec. 21, 2010 has been disclaimed.

[21] Appl. No.: 32,876

[22] Filed: Mar. 18, 1993

Related U.S. Application Data

[63] Continuation-in-part of Ser. No. 723,063, Jun. 28, 1991, Pat. No. 5,272,348, which is a continuation-in-part of Ser. No. 431,307, Nov. 13, 1989, abandoned.

[51] Int. Cl.[5] .............................................. G01T 1/105
[52] U.S. Cl. ................................. 250/484.5; 250/337
[58] Field of Search ............ 250/337, 581, 588, 474.1, 250/484.2, 484.3, 484.4, 484.5

[56] References Cited

U.S. PATENT DOCUMENTS 5,028,794  7/1991  Miller ................................. 250/337

Primary Examiner—Paul M. Dzierzynski
Assistant Examiner—Richard Hanig
Attorney, Agent, or Firm—Paul W. Zimmerman

[57] ABSTRACT

Dose of radiation to which a body of crystalline material has been exposed is measured by exposing the body to optical radiation at a first wavelength, which is greater than about 540 nm, and measuring optical energy emitted from the body by luminescence at a second wavelength, which is longer than the first wavelength. Reduced background is accomplished by more thorough annealing and enhanced radiation induced luminescence is obtained by treating the crystalline material to coalesce primary damage centers into secondary damage centers.

20 Claims, 8 Drawing Sheets

METHOD FOR INCREASED SENSITIVITY OF RADIATION DETECTION AND MEASUREMENT

CROSS-REFERENCE TO RELATED APPLICATION

This is a continuation-in-part of co-pending patent application Ser. No. 07/723,063 filed Jun. 28, 1991 now U.S. Pat. No. 5,272,348, which is a continuation-in-part of application Ser. No. 07/431,307 filed Nov. 3, 1989, now abandoned.

BACKGROUND OF THE INVENTION

When a solid-state crystal is exposed to ionizing radiation, several absorption bands make their appearance at increasingly higher levels of radiation damage. In the case of the alkali halides, the F-band is the first of the radiation damage centers to produce a detectable absorption band. With increasing radiation exposure, a second damage center builds up in the absorption spectrum. The second damage center is known as the M-center and is generally thought to consist of two adjacent F-centers. Absorption measurements in LiF indicate that the peak of the M-center absorption occurs at 443 nm.

Highly purified lithium fluoride (LiF) crystals have long been used as optical windows. Optical grade LiF is known for its excellent transmission from the deep ultraviolet through the infrared. LiF crystals have been used for high-level (Mega-Rad) gamma dosimetry using radiation-induced absorption peaks measured with a spectrophotometer. However, absorption measurements are a very insensitive way to measure these radiation damage centers.

Alkali halides have been used to measure the dose of radiation to which crystalline material has been exposed by exciting the crystalline material with optical radiation at a wavelength that corresponds to that of a known absorption band and observing the luminescence.

Although the F-center provides the greatest concentration of damage centers for a given radiation exposure, the luminescence of the F-center is thermally quenched below room temperature and therefore it is of limited usefulness in quantifying ionizing radiation exposure using luminescence techniques. However, excitation into the longer wavelength M-center absorption band at room temperature produces luminescence. M-center luminescence involves a substantial Stokes' shift, allowing the luminescence to be observed at a significantly different wavelength from the exciting wavelength.

D. F. Regulla, Lithium Fluoride Dosimetry Based on Radiophotoluminescence, Health Physics, Vol. 22, pp. 491–496 (1972) discloses a dosimetry technique in which luminescence of doped LiF that has been irradiated is excited by light at 450 nm. The luminescence spectrum includes peaks at 520 nm and 620 nm.

S. Datta and A. E. Hughes, Luminescence Dosimetry Using Sodium Fluoride Single Crystals, Health Physics, Vol. 29, pp. 420–421 (1975) discloses an investigation using NaF excited by light at 350 nm and with a luminescence peak at 660 nm.

In the case of the work reported by Regulla, the LiF that is irradiated is doped. The peak that is reported at 520 nm is not observed with pure LiF.

The application 07/431,307 ('307) discloses that radiation damage can be quantified by measuring the M-center luminescence. The peak of the M-center emission spectrum in LiF occurs at about 665 nm. In accordance with the application ('307), excitation of an LiF crystal with light at a wavelength that closely matches the wavelength at which the peak of the M-center absorption occurs was found to significantly amplify the luminescence yield of the M-center of LiF.

A disadvantage of the techniques mentioned above is that they require excitation sources that emit light at relatively short wavelengths. Lasers that emit light at such short wavelengths are much more expensive than lasers that emit light in the red and infrared regions. A further disadvantage of the above mentioned techniques is that they do not reliably measure radiation exposures below 1 mR.

The applicant is not aware of any published work in which the peak of the M-center absorption band of sodium fluoride (NaF) is reported.

SUMMARY OF THE INVENTION

A more sensitive method of measuring radiation damage than absorption measurement can be accomplished by measuring the M-center luminescence. Excitation of an LiF crystal with a 442 nm He—Cd laser has been found to significantly amplify the luminescence yield of the M-center of LiF. An He—Cd laser was the preferred excitation laser because absorption measurements in LiF indicate the peak of the M-center absorption occurs at 443 nm. Laser stimulation produces an excited state of the M-center, which undergoes a very strong Stokes' shift The peak of the M-center emission spectrum occurs at 665 nm with a half-width of 0.36 eV. Since the excitation wavelength differs significantly from the emission wavelength, measurement of the deep red emission can be done simultaneously with the excitation. Therefore, optical filtration provides a means of measuring the M-center luminescence simultaneously with laser excitation into the M-center absorption band. The population of M-centers grows with increasing radiation damage, and therefore M-center luminescence provides a basis for radiation dosimetry. Readout of the LiF can be accomplished in a fraction of a second.

Sensitivity, or the ability to distinguish and measure yet lower doses of radiation, has been found to be further improved according to the present invention by (a) more thorough annealing of LiF crystals prior to radiation exposure thereby reducing the background signal from the crystals themselves and (b) causing primary radiation damage centers, for example F-centers, to coalesce into secondary radiation damage centers, for example M-centers, thereby increasing radiation induced luminescent yield of the crystals.

While all members of the alkali halide family are candidates for M-center luminescence dosimetry lithium fluoride (LiF) was chosen for a number of reasons. First, the crystal is commercially available in large quantities through its use as optical window material. Secondly, LiF is nearly tissue equivalent in its energy response to photons, making it a suitable material for mixed field dosimetry applications. Finally, LiF can be excited by a low cost, commercially available blue-light laser and its M-center luminescence occurs significantly within the visible spectrum. This feature simplifies light detection since phototubes that are sensitive to the visible light spectrum are readily available. Data describing the dosimetric properties of the M-center and other general physical data concerning the M-center are presented in the detailed description, which also discusses the possibilities for M-center dosimetry in LiF.

M-center luminescence exists in almost every solid-state crystal which can be artificially grown at the present time and is not restricted to the alkali halide group. Each crystal has a characteristic M-center absorption band which can be measured following a large radiation exposure (around 1 Mega R). Illumination into the M-center absorption band with laser light stimulates M-center luminescence which occurs at a significantly different wavelength from the exciting laser light beam. Easy separation and detection is possible simultaneously with the exciting light by using an optical filter which absorbs the exciting light and transmits the M-center luminescence.

It has been discovered that the M-center absorption peak of radiation-damaged NaF at a wavelength of about 500 nm. When irradiated NaF is excited with light at a wavelength of about 500 nm, it emits light over a range from about 580 nm to about 750 nm with a peak at about 620 nm. It has also been discovered that when a body of pure NaF that has been exposed to ionizing radiation is excited with light at a wavelength of about 632 nm, it emits light over a range from about 680 nm to about 1050 nm with a peak in the luminescence curve at about 875 nm. Further, a body of pure, i.e., undoped, alkali halide, particularly LiF or NaF, that has been exposed to ionizing radiation and is excited by light at a wavelength significantly longer than that of the peak of the M-center absorption spectrum emits light in the infrared region with an intensity that depends on the dose of radiation to which the body was exposed.

It has been further discovered that (a) more thorough annealing reduces background signals and (b) that coalescence of primary radiation damage centers into secondary radiation damage centers enhances radiation induced luminescent yield by several decades of from about 20 to 50 times thereby permitting measurement of radiation exposures below 1 mR.

In accordance with the invention, a method of measuring dose of radiation to which a body of pure NaF has been exposed comprises exposing the body to optical radiation at a wavelength of about 500 nm, and measuring optical energy emitted from the body by luminescence at a wavelength of about 620 nm.

Also in accordance with the invention, a method of measuring dose of radiation to which a body of crystalline material has been exposed comprises exposing the body to optical radiation at a first wavelength, which is greater than about 540 nm, and measuring optical energy emitted from the body by luminescence at a second wavelength, which is longer than the first wavelength.

Further in accordance with the invention, a method of measuring dose of radiation to which a body of crystalline material that undergoes M-center absorption has been exposed comprises exposing the body to optical radiation at a first wavelength that is significantly longer than that of the peak of M-center absorption, and measuring optical energy emitted from the body by luminescence within a range of wavelengths greater than the first wavelength.

Yet further in accordance with the invention, a method of measuring dose of radiation to which a body of crystalline material, that undergoes M-center absorption, has been exposed comprises heat treating the body at an elevated temperature for a preselected time then exposing the body to optical radiation at a first wavelength that is significantly longer than that of the peak of M-center absorption, and measuring optical energy emitted from the body by luminescence within a range of wavelengths greater than the first wavelength.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Optical grade LiF single crystals (6 mm×6 mm×6 mm) were selected for the M-center measurements. Since an appreciable population of M-centers are present in commercially available crystals, the centers are erased by heat treatment. While a heat treatment in air at 873 K. for 1 hr was found satisfactory in reducing the M-center background for many applications, further reduction of background is desirable. In accordance with the present invention, background signal can be reduced further by heat treating at lower temperatures for longer periods of time as shown in the accompanying table.

| Background Signal for Various Annealing Parameters | | | | |
|---|---|---|---|---|
| Annealing Parameters | | Background Signal Counts × $10^{-5}$ | | |
| Temperature (°C.) | Time (Hours) | Average Counts | Range of Counts | Number of DataPoints |
| 600 | 1 | 7 | 4–10 | 5 |
| 550 | 1 | 25 | 10–40 | 5 |
| 550 | 9 | 1.1 | 0.5–1.75 | 5 |

The data in the previous table indicate more thorough annealing or erasure by keeping the crystals at an elevated temperature for several hours. However, treatment at 600° C. may cause reaction between crystals and glass (Pyrex) dishes. Treatment at 550° C. avoids this reaction.

After a 1 hour heat treatment at 600° C., some of the crystals were kept as controls, while the remainder were exposed to 0.26, 2.6, 26, and 260 mC/kg from a $^{60}$Co source. After irradiation, the crystals were stored in paper envelopes to prevent unwanted light exposure.

Figure 1:
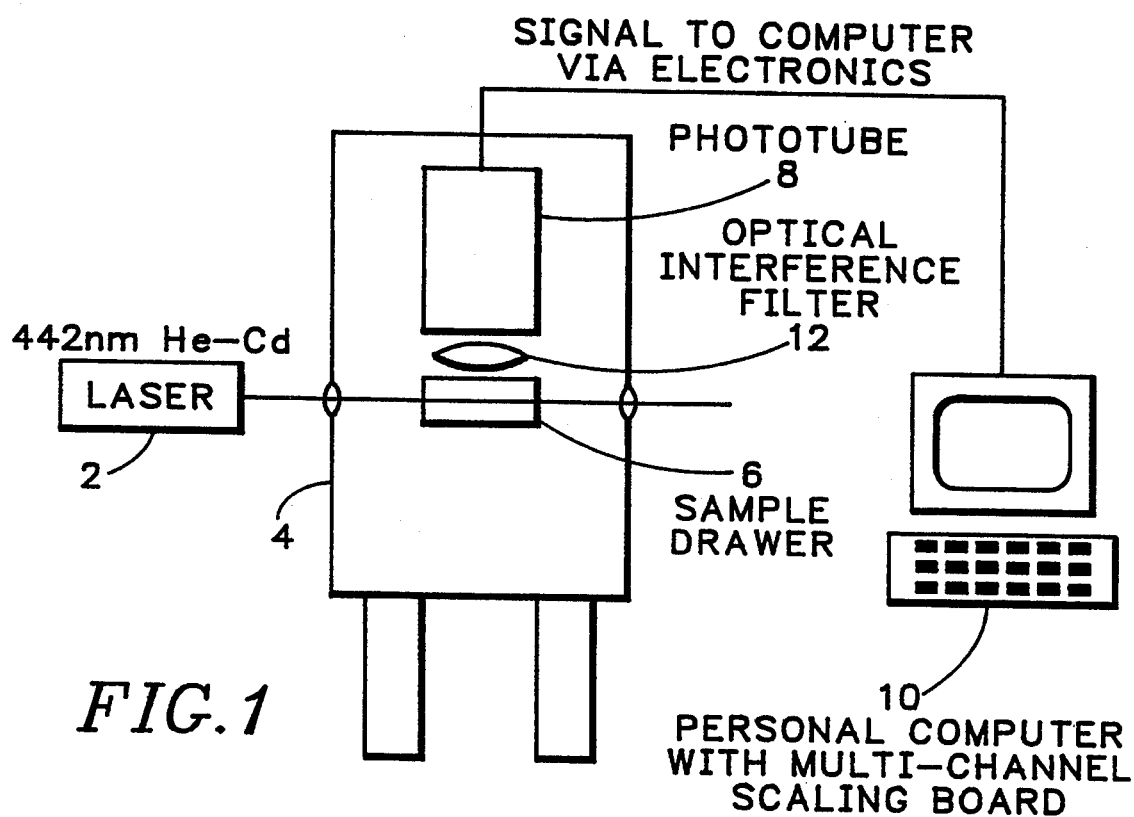
FIG. 1 is a diagram of the M-center luminescence readout system. The He—Cd laser produces 70 mW at 442 nm with a beam diameter of 1 mm. The reader consists of a light tight metal box with a sample drawer for insertion and removal of the LiF crystals. The chamber surfaces are made of a black plastic to reject and shield stray light. An RCA 8852 phototube with a broadband optical interference filter is used to reject the laser light and transmit the M-center luminescence. A personal computer houses a multichannel scaling board for photon counting capable of 50 MHz.

As shown in FIG. 1, the readout apparatus consisted of three distinct functional units: a 70 mW He—Cd 442 nm laser 2, a light-tight box 4 that contained the sample chamber 6 and phototube 8, and a photon counting system 10. The He—Cd 10 laser beam was focused to beam diameter of 1 mm at the crystal face and transmitted through the crystal at the centers of two opposite cube faces. To provide the laser excitation light to the crystals, the laser beam path and the sample chamber were made of black plastic which helped shield stray room light and laser scatter. A broadband interference filter 12 centered at 650 nm was chosen to prevent the 442 nm He—Cd laser light from reaching the phototube 8 and to transmit the M-center luminescence. The filter provided a 650 nm peak transmission of 50% and a bandwidth of 70 nm. Transmission of the scattered 442 nm He—Cd laser light was reduced to 0.01% by the filter 12. A 1 mm aperture was placed between the optical filter and the crystal to help reject some of the background light that accompanies the M-center luminescence. The phototube 8 chosen for the experiment was an RCA 8852 with a red-extended multi-alkali photocathode and was mounted at 90° from the axis of the laser beam. This phototube was chosen for its suitability for photon counting and its excellent red response. The photon counting system consisted of a preamplifier, amplifier, discriminator, and a multichannel scaling board housed in a personal computer. The counting system is capable of 50 MHz rates.

Readout consisted of passing the 70 mW laser beam through the sample chamber and into the LiF crystal while simultaneously counting photons with the multichannel scaling board within the computer. A region of interest was chosen which consisted of 400 channels with each channel having a time width of 50 ms. An integration was performed over the 400-channel region of interest which lasted for 20 sec.

Figure 2:
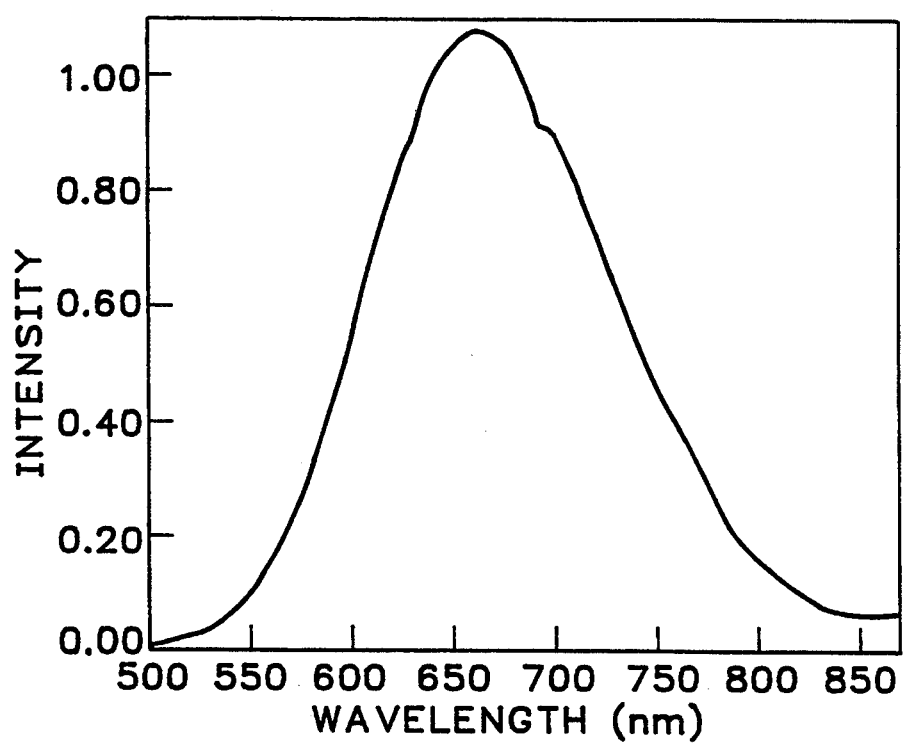
FIG. 2 shows an LiF M-center luminescence optical emission spectrum measured using a Tracor Northern optical multichannel analyzer. The M-center luminescence emission was excited by a 442 nm He-Cd laser. The LiF crystal was given an exposure of 2.6 C/kg using a $^{60}$Co source. The peak of the emission spectrum is 665 nm with a half-width of 0.36 eV.

FIG. 2 is a LiF M-center luminescence optical emission spectrum measured using a Tracor Northern optical multi-channel analyzer. The LiF crystal was given an exposure of 2.6 C/kg using a $^{60}$Co gamma source. The peak of the emission spectrum is 665 nm with a half width of 0.36 eV. This result was used to determine the optimal interference filter to use in the M-center luminescence reader. An optical absorption spectrum for a heavily exposed LiF crystal was measured using a Hewlett Packard diode array spectrometer.

Figure 3:
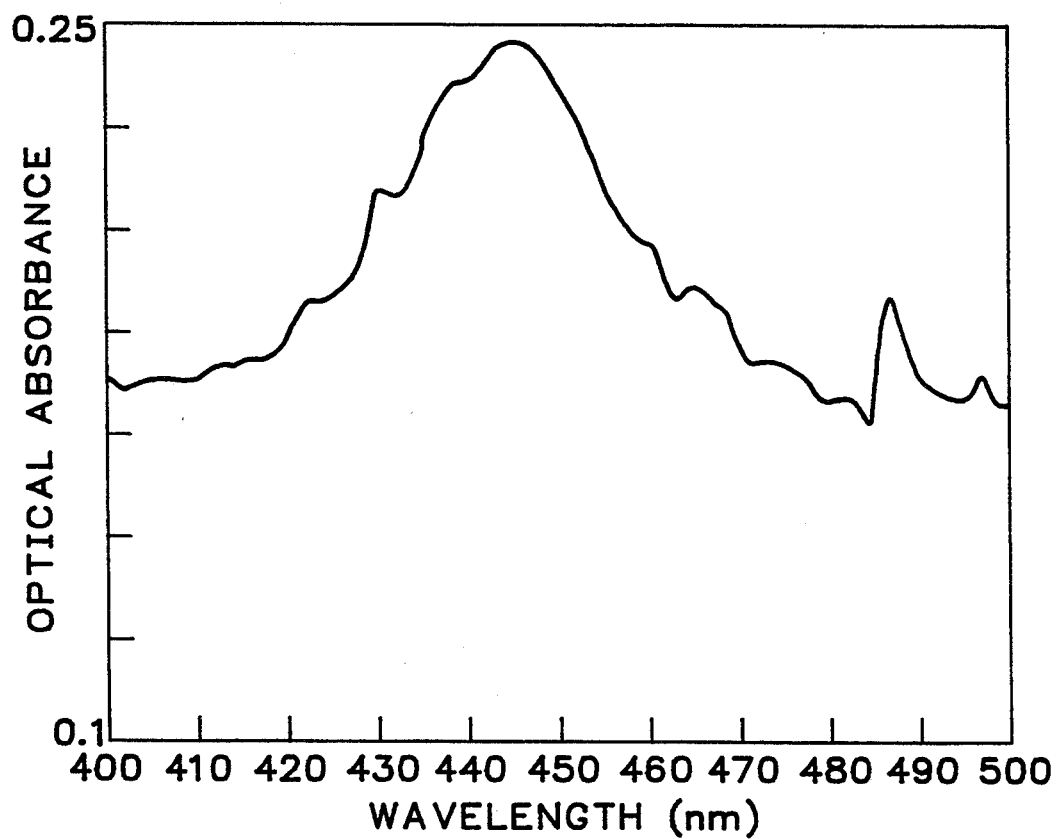
FIG. 3 shows an optical absorption spectrum for a LiF crystal exposed to 260 C/kg. The optical path length of the LiF crystal was 6 mm. The optical absorption spectrum was taken using a Hewlett-Packard diode array spectrometer. The peak of the absorption spectrum was measured to be 443 nm.

This absorption spectrum is shown in FIG. 3. The exposure level for the absorption spectrum was 260 C/kg. To resolve the M-center absorption curve adequately, it was found that 260 C/kg was the minimum exposure that could be used. The absorption curve peaks at 443 nm, which matches the 442 nm line of the He—Cd laser.

The following table shows the M-center response as a function of $^{60}$Co gamma exposure of 0.26, 2.6, 26 and 260 mC/kg.

| Exposure Level (mC/kg$^{-1}$) | Background Subtracted (Counts/mC/kg$^{-1}$) |
|---|---|
| Laser Beam at Full Power (50 mW) | |
| 0.26 | 7,040,000 |
| 2.6 | 7,040,000 |
| 26 | 6,190,000 |
| Laser Beam Through a 10% Neutral Density Filter | |
| 2.6 | 5,380.000 |
| 26 | 5,270,000 |
| 260 | 5,620,000 |

Two laser power levels were used due to counting saturation of the 260 mC/kg exposure using the full 70 mW of laser power. Within experimental uncertainty, the response follows a linear relationship. The crystals exposed to 0.26 mC/kg gave an integral response that was twice as high as a crystal that received no exposure.

Figure 4:
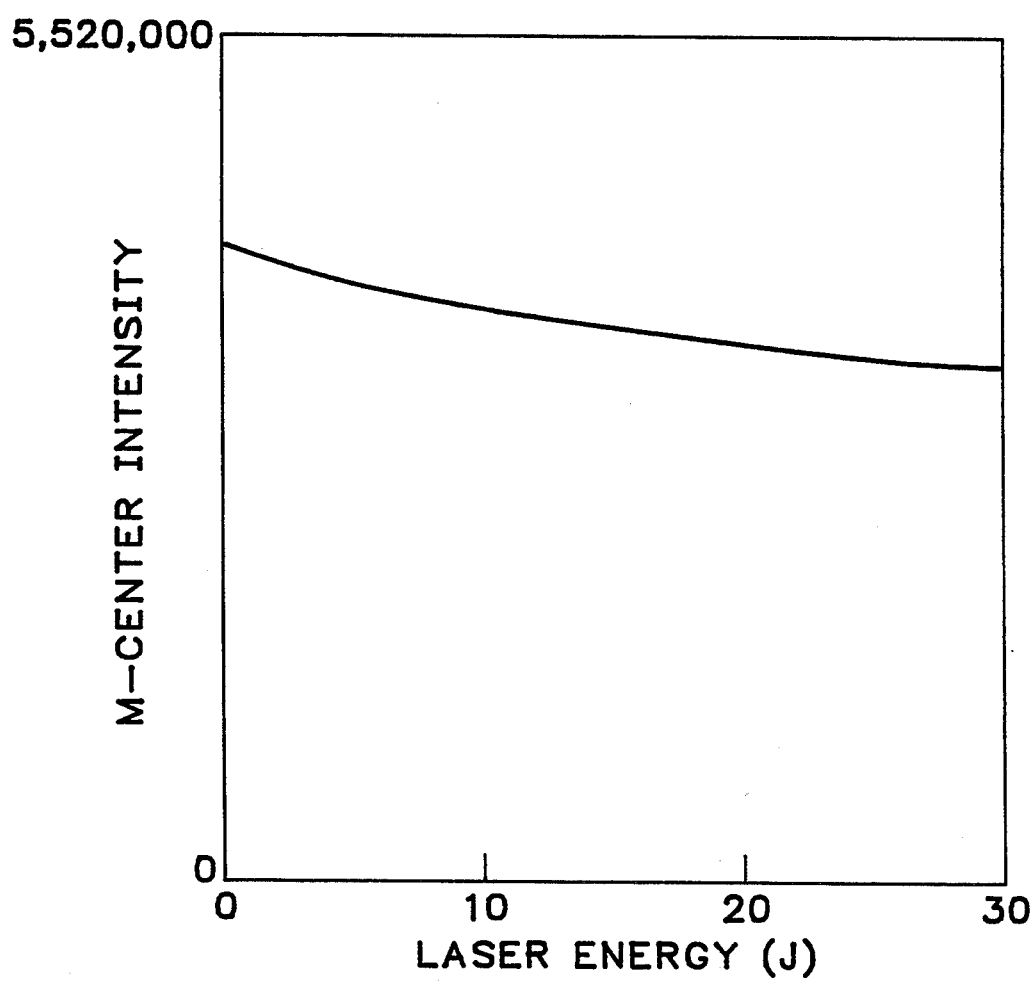
FIG. 4 shows the optical bleaching rate of the M-center luminescence as a function of 442 nm He—Cd laser energy incident upon the crystal. The crystal used in this figure was exposed to 26 mC/kg. The time constant for the optical bleaching was found to be 32 sec. The total reduction in M-center luminescent intensity was 20% for a delivered energy of 30 J.

FIG. 4 is a plot of the bleaching rate of the M-center luminescence as a function of time. The crystal was exposed to 26 mC/kg and the laser power was 70 mW delivered for 600 sec. The time constant for the bleaching process was found to be 32 sec and appears to remain constant over time. For the entire time in which the M-center luminescence was monitored, the total reduction due to bleaching was only 20%.

The time constant associated with the decay of the excited M-center was measured in a straightforward manner. The same readout apparatus that was used for the previous measurements was used in the time-constant measurements. A nitrogen-pumped dye laser was used to excite an irradiated LiF crystal within the readout apparatus, the signal was fed into a Hewlett-Packard digitizing fast storage oscilloscope. The oscilloscope was allowed to average the M-center decay signal until a smooth set of data was obtained. The time constant measured was 70 ns. This appears to be consistent with measurements of the other authors (5,6).

The M-center luminescence in LiF occurs with a time constant on the order of 70 ns. Based on this measurements, each M-center in LiF should be capable of producing around 107 photons per second at saturation. A simple calculation based on the oscillator strength of the M-center in LiF predicts the M-center luminescence saturates with a 442 nm laser beam at 40 kW. Since the laser used in the present experiment is 70 mW, large gains in the M-center luminescence signal can be achieved by increasing the excitation power, for example, through use of a high intensity argon laser.

Phototubes that record the M-center luminescence must be extremely sensitive to the red-infrared emission spectrum if a sensitive dosimeter capable of personnel monitoring is to be realized. Unfortunately, red extended phototubes capable of single photon counting have characteristically large dark counts associated with thermionic emission. A commercially available dye laser provides an elegant solution to the problem of high dark counts and also satisfies the need for large peak powers to achieve saturation of the M-center luminescence. Since dye lasers typically have extremely short pulse lengths, the red extended phototube dark count within the duration of the dye laser pulse becomes negligible. The flashlamp-pumped dye laser can be made to produce very large peak powers with time constants of 10 to 100 $\mu s$ (microseconds), orders of magnitude longer than the time constant for the decay of excited M-centers. Therefore, through the use of the flashlamp-pumped dye laser, the M-center luminescence is maximized by producing saturation, while allowing a sampling of the luminescence in a time period that is much longer than the decay constant of the M-center. This condition will provide better statistical results. Fortunately, the M-center luminescence yield at saturation is theoretically optimized with the same laser that produces a negligible dark count.

The most restricting aspect of the M-center luminescence technique in LiF is the large fluorescence background. The unwanted background, stimulated by the direct and scattered laser light, emanates from a number of sources. The first such source is the fluorescence that results within the chamber surfaces from laser light scatter. A careful chamber design both in geometry and in material selection can greatly reduce this source of unwanted light. A second source is the fluorescence that emanates from the crystal surfaces. The surface fluorescence is clearly visible by the human eye under the proper conditions and represents the largest source of unwanted light. The surface fluorescence depends on the nature of the fluorescing species at the surface. The third source of unwanted light is from the bulk of the crystal. Impurities within the crystal that are excited by the laser beam will produce light that interferes with the desired signal. This source of light has not been observed at the present time, due to the large fluorescence signals that mask the bulk crystal effects. The fourth source of background light is from the leakage of the optical filter used both to condition the laser and to block stray laser light from reaching the phototube. Since the photo-tube is highly sensitive to the exciting laser wavelength, proper filtration is essential. High quality filters and the use of multiple filters may prevent this source of background from causing any serious problems. The final source of background light is perhaps the most troubling.

In the dosimeter application, it is desirable that the dosimeter be reusable, and this implies the need to anneal the crystal so as to remove the M-centers. As noted previously, thermal treatment can be used to eliminate the M-centers. However, at some point of the heat treatment, the M-center will reach an equilibrium level, at which point further reduction in M-center concentration becomes difficult. It remains to be seen whether this concentration level will be suitably low to perform adequate personnel radiation monitoring.

Based on the foregoing, it will be appreciated that M-center luminescence in LiF using a $^{60}Co$ gamma source has been demonstrated to be a useful dosimeter in the exposure range of 0.026 to 260 mC/kg. The major difficulty in using LiF for M-center luminescence dosimetry is the large background of fluorescence which accompanies the M-center luminescence signal. Low cost diode lasers emitting in the infrared are currently available which could be used to excite those crystals which have their M-center absorption band in the infrared.

Figure 5:
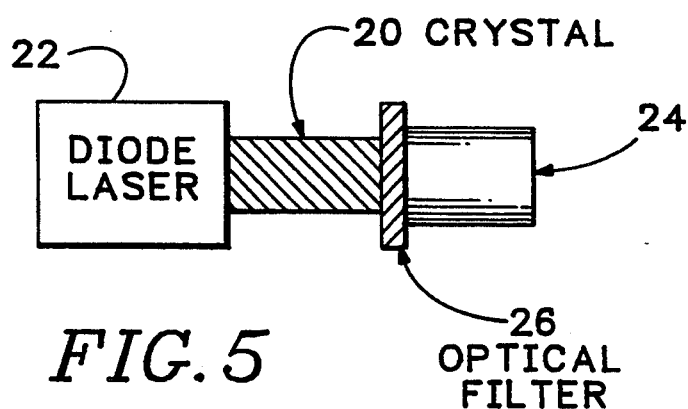
FIG. 5 is a schematic diagram of a personnel dosimeter based on an LiF crystal.

Many alkali halides have their M-center luminescence absorption band in the infrared. An inexpensive infrared detector can be used to detect the infrared luminescence allowing a low cost laser and detection system to be technically feasible. In this way, the M-center luminescence can be used as a means of personnel or environmental dosimetry. By coupling a small infrared light source with an infrared detector and suitable optical filters, the combination becomes a radiation monitor which gives a realtime analysis. FIG. 5 illustrates such a dosimeter, comprising a crystal 20 to which are mounted a battery-powered diode light source 22, such as diode laser, a light detector 24, such as an avalanche photodiode, to detect the crystal's M-center luminescence, and an optical filter 26 to block the laser light and transmit the crystal's M-center luminescence.

Optically stimulated luminescence is described in co-pending U.S. patent applications Ser. Nos. 07/213,245, now U.S. Pat. No. 4,954,707, and 07/420,293, now U.S. Pat. No. 5,025,159, the contents of which are hereby incorporated by reference herein.

Figure 6:
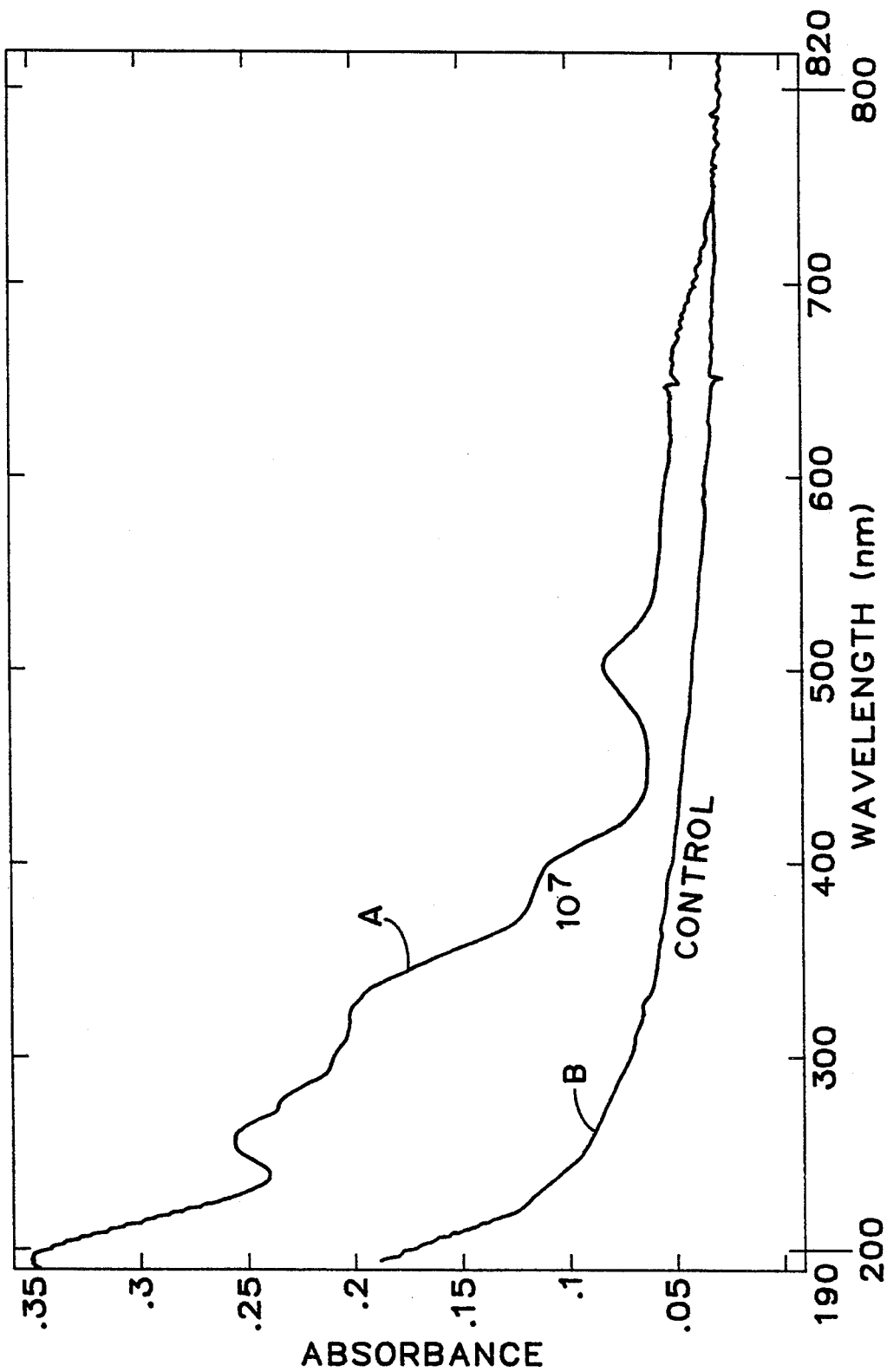
FIG. 6 illustrates the absorption spectrum of pure NaF that has been exposed to a dose of gamma radiation of $10^7$ R

FIG. 6 illustrates (curve A) the absorption spectrum of pure NaF that has been exposed to a dose of 107 R, and, as a control (curve B), the absorption spectrum of NaF that has not been irradiated. The absorption spectra shown in FIG. 6 were measured using known techniques and conventional equipment. It will be seen that curve A exhibits a peak at about 505 nm. This is the M-center absorption peak. It will also be seen from curve A that, within the measurement domain, there is no significant absorption peak at wavelengths longer than that of the M-center absorption peak.

Figure 7:
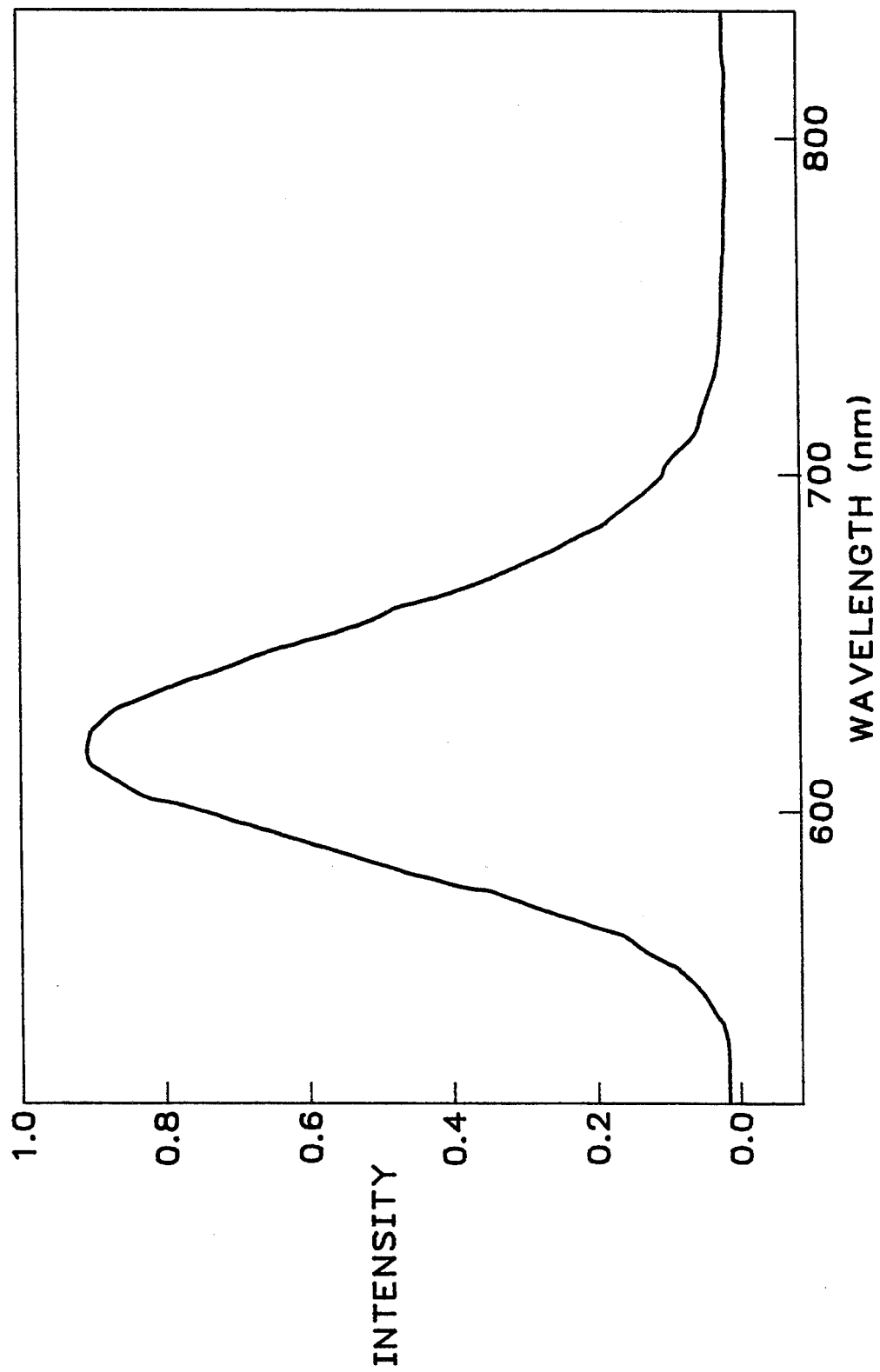
FIG. 7 illustrates the emission spectrum of pure NaF that has been exposed to gamma radiation after excitation by light at 514 nm.

A single crystal of pure NaF was exposed at room temperature (about 20° C.) to gamma radiation from a $^{60}Co$ source. A laser light source that emits light at a wavelength of about 510 nm, such as an argon laser that emits at 514 nm, was positioned so that its output light beam was incident on the crystal, and a spectrometer was positioned to receive light emitted from the crystal and measure the intensity of received light as a function of wavelength. The luminescence spectrum that was measured is shown in FIG. 7. The luminescence spectrum has a pronounced peak at about 620 nm.

Figure 8:
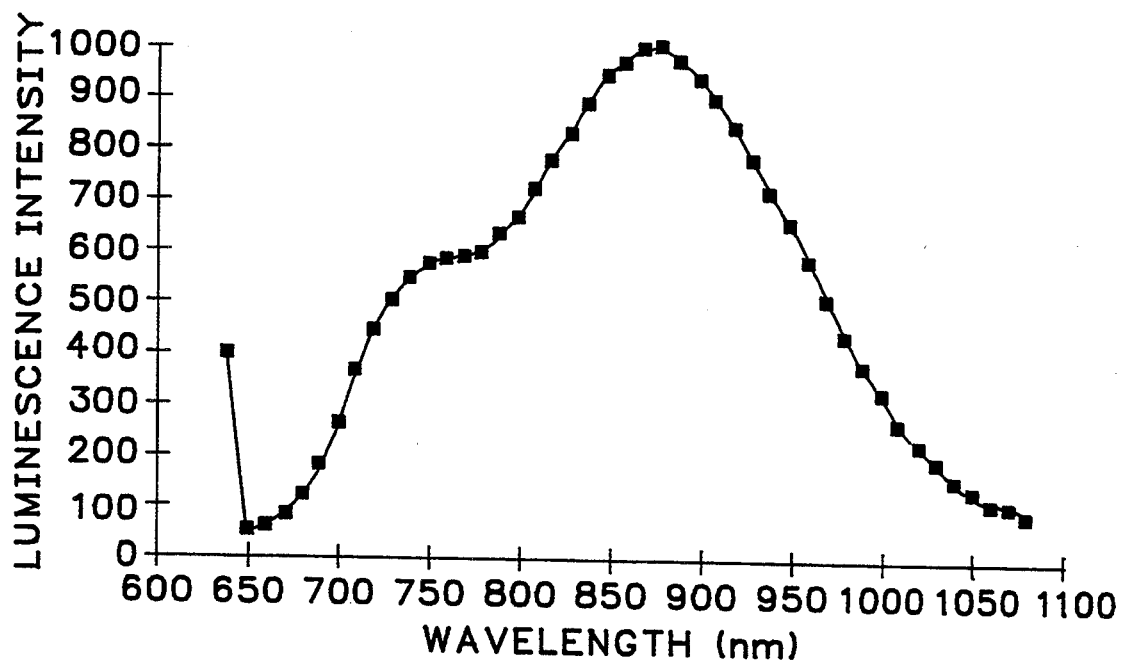
FIG. 8 illustrates the emission spectrum of pure NaF that has been exposed to gamma radiation after excitation by light at 632 nm.

In another experiment using irradiated single crystals of pure NaF, the argon laser was replaced by a helium-neon laser that emits light at 632 nm. The luminescence spectrum that was measured is shown in FIG. 8 and ranges from 680 nm to 1050 nm and has a peak in the infrared region at about 875 nm. The amplitude of the peak of the luminescence emission was found to be substantially related to the dose of gamma radiation from approximately 1 R to 100,000 R.

Since FIG. 6 shows that the absorption spectrum of NaF does not have a peak at around 630 nm, the applicant believes that the effect illustrated by FIG. 8 is not highly wavelength dependent, and that excitation of pure NaF with light over a broad range of wavelengths, e.g. from 560–750 nm, would provide an emission spectrum similar to that shown in FIG. 8.

In a similar experiment with LiF, the luminescence spectrum (FIG. 4) ranged from about 650 nm to about 1050 nm and had a peak that is in the infrared region (about 730 nm). Based on the fact that the M-center absorption spectrum of LiF has its peak at about 433 nm, the applicant concludes that excitation of LiF with light at a wavelength from 550–700 nm would provide an emission spectrum similar to that shown in FIG. 9.

The observations described with reference to FIGS. 8 and 9 suggest that luminescence of a radiation-damaged crystalline material, particularly an alkali halide in the pure state, can be excited by lasers that emit light in the red and infrared regions and that such luminescence provides a sensitive measure of gamma radiation dose.

In addition to the increased sensitivity, the technique of stimulating luminescence by excitation with light at a wavelength significantly greater than that of the peak of the M-center absorption spectrum has the advantage that the laser light source used to excite the crystal can be much less expensive than the laser light source used to stimulate M-center emission, as described in the copending application.

The lattice constant for LiF is about 4 while that for NaF is about 5. The applicant believes that the optimum wavelength for excitation of the crystalline material to provide infrared luminescence depends on the lattice constant of the material: crystals that have larger lattice constants have longer optimum excitation wavelengths, and the peak emission is in turn shifted to a longer wavelength. At shorter lattice constants, there is a greater likelihood that the damage centers that give rise to luminescence will be thermodynamically unstable, and consequently such materials would have limited utility for dosimetry.

Figure 9:
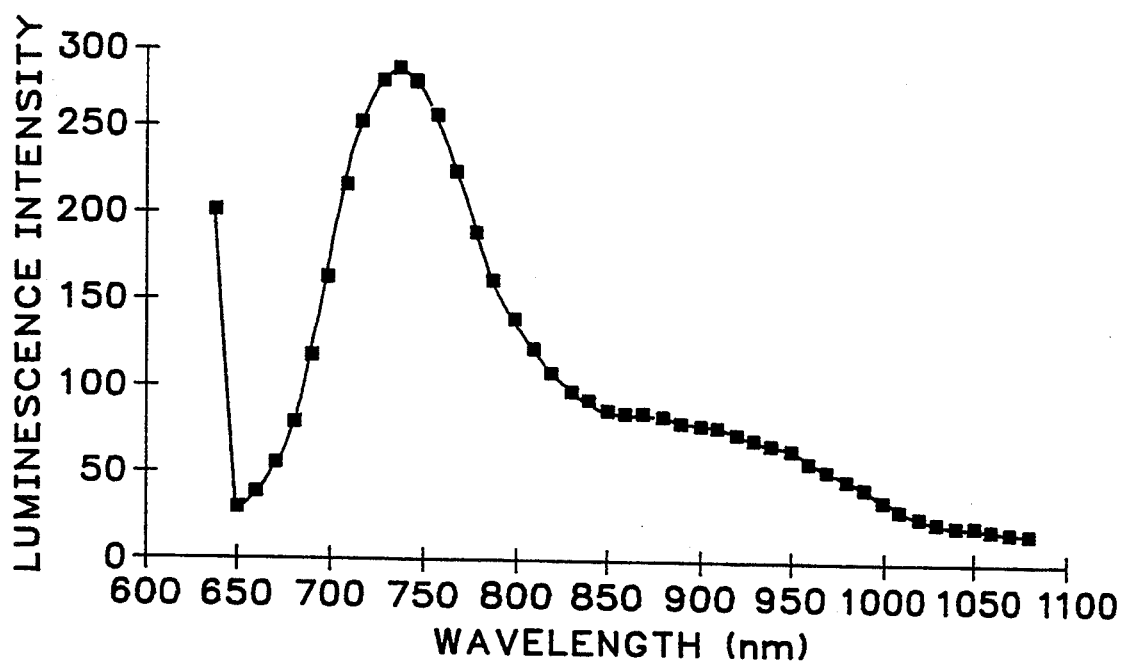
FIG. 9 illustrates the emission spectrum of pure LiF that has been exposed to gamma radiation after excitation by light at 632 nm.

The basis for the observations described with reference to FIGS. 8 and 9 is not fully understood. The infrared luminescence might arise from a damage center that has previously been observed or it might arise from a center that has not previously been observed.

A device similar to that shown in FIG. 5 may be used to measure radiation dose or level by detecting and measuring infra-red luminescence generated by the broad band effect described with reference to FIGS. 8 and 9, as opposed to M-center luminescence.

Figure 10:
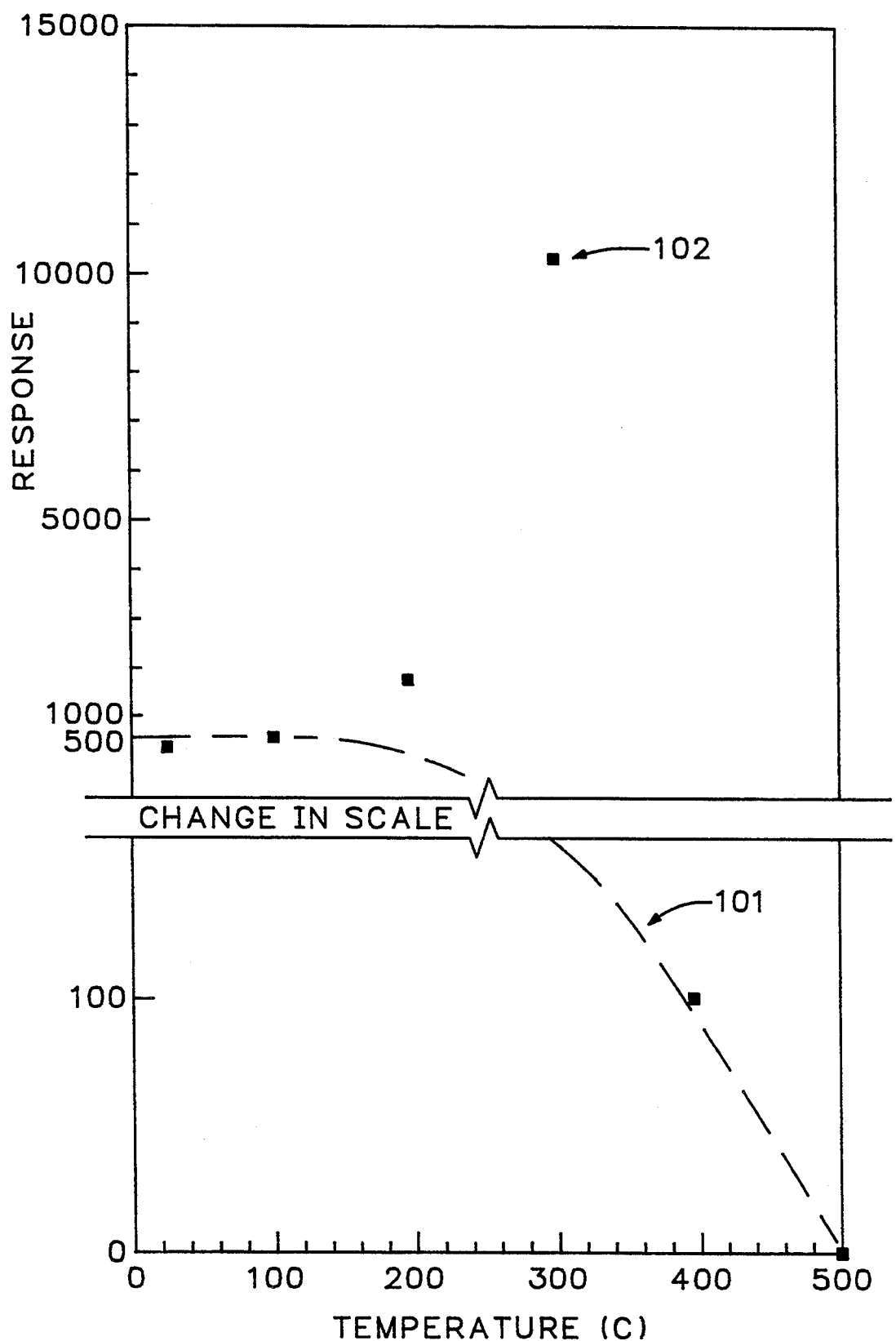
FIG. 10 shows the luminescent response of lithium fluoride crystals that have been irradiated to 50 R and heat treated at temperatures ranging from about 25° C. to about 500° C. for a time of about 1 hour.

A surprising increase in luminescent response was discovered upon measuring an annealing curve. After annealing by heating the lithium fluoride crystals to 600° C. for 1 hour in an oven, they were exposed to a radiation level of 50 R and divided into groups with each group separately heat treated by heating to a temperature for a time of about 1 hour and permitting cooling back to ambient temperature. A control group was not heat treated and remained at ambient temperature. Subsequent measurement of secondary damage center (M-center) luminescence as herein described were performed for each group of crystals. It was expected that the annealing curve would have a concave downward quarter circular shape as illustrated in FIG. 10 by the dashed line (101). However, an unexpected and surprising peak (102) was observed as shown in FIG. 10, demonstrating a response about 23 times greater than expected.

Figure 11:
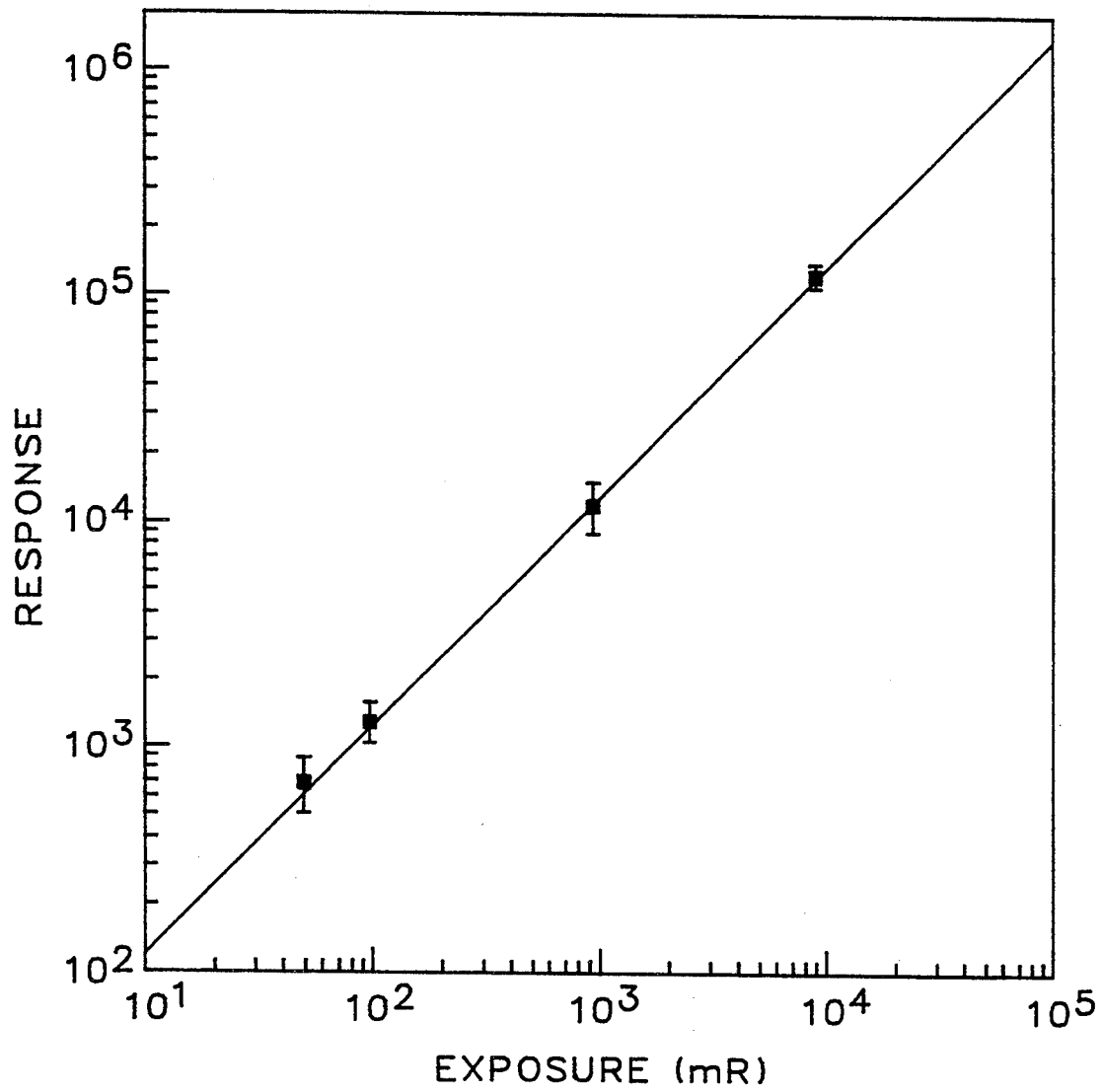
FIG. 11 shows the luminescent response of lithium fluoride crystals that have been irradiated from about 50 mR to about 10 R and heat treated at a temperature of about 300° C. for a time of about 1 hour.

As a confirmation of the first observation, LiF crystals annealed at 550° C. for 1 hour were divided into sets with each set exposed to radiation of from about 50 mr to about 10 R. Each set was heat treated at about 300° C. for about 1 hour. Peak responses for each level of radiation are shown in FIG. 11. This graph suggests that the enhancement effect is linear with radiation exposure. Each data point exhibits a response that is 40 times greater than non-heat treated crystals.

Further observations were made for crystals annealed at 550° C. for 1 hour then divided into three sample pairs with each pair exposed to $10^3$ R, $10^4$ R and $10^5$ R, respectively i One sample of each pair was heat treated at about 300° C. for about 1 hour and the other sample of each pair was not heat treated. Upon laser excitation of each pair, it was visually observed that there did not appear to be a significant qualitative difference in luminescence between heat treated samples and other non-heat treated samples.

Hence, it appears that enhanced luminescent response is a function of both temperature of heat treatment and level of irradiation.

Standard deviations of the peaks ranged from 8–15% compared to 2—3% standard deviation of non-heat treated crystals. However, the greater standard deviation is attributable to the use of a small oven exhibiting uneven heating of the crystals. More uniform results are expected from using an oven with more uniform temperature distribution.

With reduced background from more thorough annealing, and increased radiation induced luminescence by heat treatment, it is expected that crystals exposed to radiation of less than 1 mR would provide radiation induced luminescent counts of below about 80,000 counts which is measurable with a photomultiplier tube. This is in contrast to an unenhanced crystal providing induced luminescent counts of below about 2,000 counts for radiation less than 1 mR.

Subsequent investigation suggested that the increased luminescent response peak is a result of coalescence of primary radiation damage centers into secondary radiation damage centers. The data from this investigation are presented in the following table of enhancement factors. The enhancement factor is defined as the ratio of measurement counts after coalescence to the measurement counts before coalescence for a given radiation exposure.

| Enhancement Factors at Various Temperatures For an Exposure of 5 R | | |
|---|---|---|
| Temperature (C.) | Time (Minutes) | Enhancement Factor |
| 600 | 2 | 17.1 |
| 600 | 2 | 17.6 |
| 600 | 5 | 0.067$^A$ |
| 600 | 5 | 0.075$^A$ |
| 400 | 2 | 1.9 |
| 400 | 2 | 2.0 |
| 400 | 5 | 16.7 |
| 400 | 5 | 17.5 |

$^A$Enhancement Factor less than 1.0 indicates annealing

The data in the previous table suggest that for temperatures above 300° C., shorter times are required to achieve similar enhancement factors. It is hypothesized that for temperatures below 300° C. that longer times would be needed. It is further hypothesized that there is a critical temperature below which the effect is not observable.

While the effect was discovered using LiF crystals, it is expected that other solid state crystals, especially alkali halide crystals would also exhibit this phenomena. The temperatures and times may be the same or different compared to LiF. Because this is a new discovery and because the underlying mechanism has not yet been fully characterized, additional investigation is needed to positively identify optimum heat treating parameters for LiF and other solid state crystals.

An additional test was performed to investigate whether the order of the process steps was important. Two groups of lithium fluoride crystals were annealed at 550 C for 1 hour. One group was then heat treated at 300 C for 1 hour and the other group was not heat treated. Both groups were then exposed to ionizing radiation of about 5 R. Subsequent laser stimulation and luminescence measurement showed no difference in luminescence between the two groups of crystals. It was therefore concluded that radiation exposure must be done in advance of heat treating in order to obtain the enhanced luminescent signal.

It will be appreciated that the invention is not restricted to the particular embodiments that have been described, and that variations may be made therein without departing from the scope of the invention as defined in the appended claims and equivalents thereof. For example, although the observations described above with reference to FIGS. 8, and 9 have been made only on two materials, namely LiF and NaF, it is believed that similar results would be observed with other crystalline materials, particularly other alkali halides. Further, although the observations regarding annealing and heat treating have been made on only one material, namely LiF, it is believed that similar results would be observed with other crystalline materials, particularly other alkali halides. Additionally, while the phenomena was discovered and demonstrated using a thermal heat treatment, any treatment means encouraging diffusion without annealing would be acceptable, for example, microwave heating, mechanical vibration such as ultrasonic, and optical excitation. Yet further, while initial annealing is preferred for most dosimetry applications, in applications including but not limited to accident dosimetry, archeological dating, and environmental sample analysis, annealing may be inappropriate or possibly destroy the information sought. However, the heat treat can be used to enhance the luminescent signal for improved accuracy of measurement.

REFERENCES

1. McLaughlin, et al., "Electron and gamma-ray dosimetry using radiation-induced color centers in LiF", Radiat. Phys. Chem. 14, pp. 467–480 (1979).
2. Seitz, "Color centers in alkali halide crystals", Rev. Mod. Physics 18, p. 348 (1946).
3. Knox, "Inversion symmetry of the M-center", Phys. Rev. Letters 2(3), 87 (1959).
4. Klick, "Luminescence of color centers in alkali halides", Phys. Rev. 79, p. 894 (1950).
5. Bosi et al., "Lifetime studies on excited (F2+) * and M-centers in NaF doped with magnesium", Phys. Stat. Sol. (b) 140, pp. 355–360 (1987).
6. Bosi et al., "New results on the decay properties of perturbed and unperturbed M-centers in NaCl:CdC$_{12}$", Phys. Star. Sol. (b) 123, pp. 519–524 (1984).

The disclosure of each reference is hereby incorporated by reference herein.

We claim:

1. A method of measuring radiation dose, comprising the steps of:
    annealing a body of optical window quality lithium fluoride to erase damage centers;
    exposing said body to ionizing radiation,
    treating said body to enhance luminescence
    exciting the lithium fluoride with optical radiation at a first wavelength that is near a peak damage center absorption center of said lithium fluoride; and
    measuring optical energy emitted from the lithium fluoride by luminescence at a second wavelength that is longer than the first wavelength.

2. A method according to claim 1, comprising exciting the lithium fluoride with coherent optical radiation at said first wavelength.

3. A method according to claim 1, comprising measuring optical energy emitted by luminescence in the visible region of the spectrum.

4. A method according to claim 1, wherein erasing is annealing that reduces crystal background to about or below 175,000 counts.

5. A method according to claim 4, wherein annealing is performed at a temperature of about 550° C. for a time of at least about 9 hours.

6. A method according to claim 1, wherein treating comprises the steps of:
    selecting a temperature and a corresponding predetermined time;
    exposing said lithium fluoride to said temperature for said predetermined time; and
    permitting said lithium fluoride to cool to ambient temperature.

7. A method according to claim 6, wherein said temperature is from about 300° C. to about 600° C. and said time is from about 1 hour to about 2 minutes respectively.

8. A method of measuring radiation dose with a crystalline material exhibiting damage center absorption, comprising the steps of:
    erasing damage centers in a body of said crystalline material;
    exposing said body to ionizing radiation,
    treating said body to enhance luminescence;
    exciting the material with optical radiation at a first wavelength that is near a peak damage center absorption center of said material; and
    measuring optical energy emitted from the material by luminescence at a second wavelength that is longer than the first wavelength.

9. A method according to claim 8, comprising exciting the material with coherent optical radiation at said first wavelength.

10. A method according to claim 8, comprising measuring optical energy emitted by luminescence in the visible region of the spectrum.

11. A method according to claim 8, wherein erasing is annealing that reduces crystal background to about or below 175,000 counts.

12. A method according to claim 11, wherein annealing is performed at a temperature of about 550° C. for a time of at least about 9 hours.

13. A method according to claim 8, wherein treating comprises the steps of:
    selecting a temperature and a corresponding predetermined time;

exposing said crystalline material to said temperature for said predetermined time; and permitting said crystalline material to cool to ambient temperature.

14. A method according to claim 13, wherein said temperature is from about 300° C. to about 600° C. and said time is from about 1 hour to about 2 minutes respectively.

15. A method of measuring radiation dose with a crystalline material exhibiting damage center absorption, comprising the steps of:

exposing said body to ionizing radiation, coalescing primary radiation damage centers into secondary radiation centers;

exciting the material with optical radiation at a first wavelength that is near a peak damage center absorption center of said material; and measuring optical energy emitted from the material by luminescence at a second wavelength that is longer than the first wavelength.

16. A method according to claim 15 wherein primary radiation damage centers are F-centers and secondary radiation damage centers are M-centers.

17. A method of measuring radiation dose with a crystalline material exhibiting damage center absorption, comprising the steps of:

obtaining a body of said crystalline material;

exposing said body to ionizing radiation;

treating said body to enhance luminescence;

exciting the material with optical radiation at a first wavelength that is near a peak damage center absorption center of said material; and measuring optical energy emitted from the material by luminescence at a second wavelength that is longer than the first wavelength.

18. A method as recited in claim 17, wherein treating comprises coalescing primary radiation damage centers into secondary radiation centers.

19. A method as recited in claim 17, wherein treating is heat treating to a temperature for a time.

20. A method according to claim 19, wherein said temperature is from about 300° C. to about 600° C. and said time is from about 1 hour to about 2 minutes respectively.

* * * * *

UNITED STATES PATENT AND TRADEMARK OFFICE
CERTIFICATE OF CORRECTION

PATENT NO. : 5,354,997
DATED : 10/11/94
INVENTOR(S) : Miller

It is certified that error appears in the above-indentified patent and that said Letters Patent is hereby corrected as shown below:

In column 10, line 15, after the word "respectively", delete "1" and insert a --.--.

In column 11, line 68, replace the word "Star" with the word --Stat--.

Signed and Sealed this

Thirtieth Day of September, 1997

*Attest:*

BRUCE LEHMAN

*Attesting Officer*  *Commissioner of Patents and Trademarks*